US010565536B2

(12) United States Patent
Braham et al.

(10) Patent No.: US 10,565,536 B2
(45) Date of Patent: Feb. 18, 2020

(54) AUTOMATED PROCESS REVERSAL

(71) Applicant: INTERNATIONAL BUSINESS MACHINES CORPORATION, Armonk, NY (US)

(72) Inventors: Anouar Braham, Ariana (TN); Joachim H. Frank, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 784 days.

(21) Appl. No.: 14/789,434

(22) Filed: Jul. 1, 2015

(65) Prior Publication Data

US 2017/0004432 A1 Jan. 5, 2017

(51) Int. Cl.
*G06Q 10/00* (2012.01)
*G06Q 10/06* (2012.01)

(52) U.S. Cl.
CPC .............................. *G06Q 10/06316* (2013.01)

(58) Field of Classification Search
USPC ...................................................... 705/7.26
See application file for complete search history.

(56) References Cited

U.S. PATENT DOCUMENTS

| | | | |
|---|---|---|---|
| 7,380,166 B2 | 5/2008 | Thatte et al. | |
| 7,949,551 B2 | 5/2011 | Kloppmann et al. | |
| 8,533,529 B2* | 9/2013 | Alves | G06F 11/1479 714/16 |
| 8,666,852 B1* | 3/2014 | Lang | G06Q 30/04 705/30 |
| 9,858,312 B2* | 1/2018 | Robinson | G06F 16/2365 |
| 2003/0093479 A1* | 5/2003 | Mellen-Garnett | G06F 9/54 709/205 |
| 2008/0189534 A1 | 8/2008 | Jeng et al. | |
| 2011/0218927 A1 | 9/2011 | Addala et al. | |

OTHER PUBLICATIONS

Boubaker et al.; Methodology and Tool for Business Process Compensation Design; 2013 17th IEEE International Enterprise Distributed Object Computing Conference Workshops; Sep. 9-13, 2013; pp. 148-157.

(Continued)

*Primary Examiner* — Johnna R Loftis
*Assistant Examiner* — Allison M Robinson
(74) *Attorney, Agent, or Firm* — Schmeiser, Olsen & Watts; Mark C. Vallone

(57) ABSTRACT

A method and system for automatically reversing a process is provided. The method includes defining a forward process comprising a set of forward activities for automatically performing an automated task. First undo activities and associated data structures, associated with undoing a first forward activity of the set of forward activities, first interdependencies between the first undo activities are defined. Additionally, first triggers comprising a first link between the first forward activity and the first undo activities are defined. Second undo activities and associated data structures, associated with undoing a second forward activity as well as second interdependencies between the second undo activities are defined. Additional second triggers comprising a second link between the second forward activity and the second undo activities are defined.

14 Claims, 11 Drawing Sheets

(56) References Cited

OTHER PUBLICATIONS

Mili et al.; Towards a Methodology for Designing Compensation Processes in Long-Running Business Transactions; Montreal Conference on eTechnologies (MCETECH'2006); May 17-19, 2006; pp. 137-14.
Khalaf et al.; Revisiting the Behavior of Fault and Compensation Handlers in WS-BPEL; Confederated International Conferences, CoopIS, DOA, IS, and ODBASE 2009; Nov. 1-6, 2009; pp. 286-303.
Dayal et al.; Business Process Coordination: State of the Art, Trends, and Open Issues; Proceedings of the 27th Very Large Database Conference; Sep. 11-14, 2001; pp. 3-13.
Du et al.; Flexible Compensation of Workflow Processes; HP Software Technology Laboratory; HPL-96-71 (R.1); Feb. 1997; 30 pages.
Object Management Group, Inc.; Business Process Model Notation; retrieved from the Internet Apr. 7, 2015; URL: http://www.bpmn.org; 1 page.

\* cited by examiner

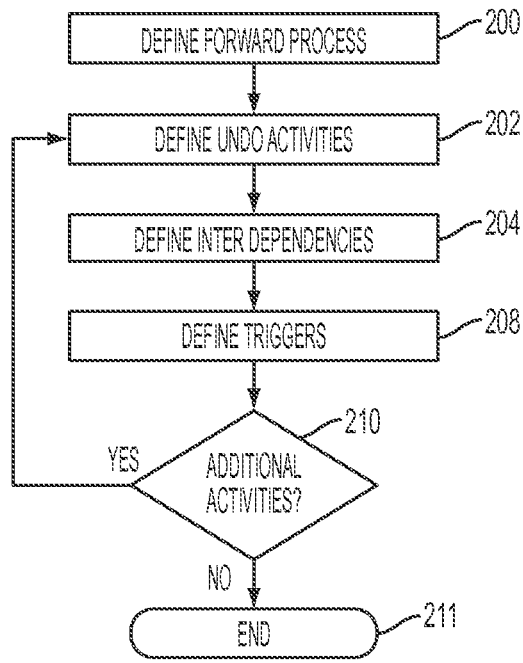
FIG. 2A
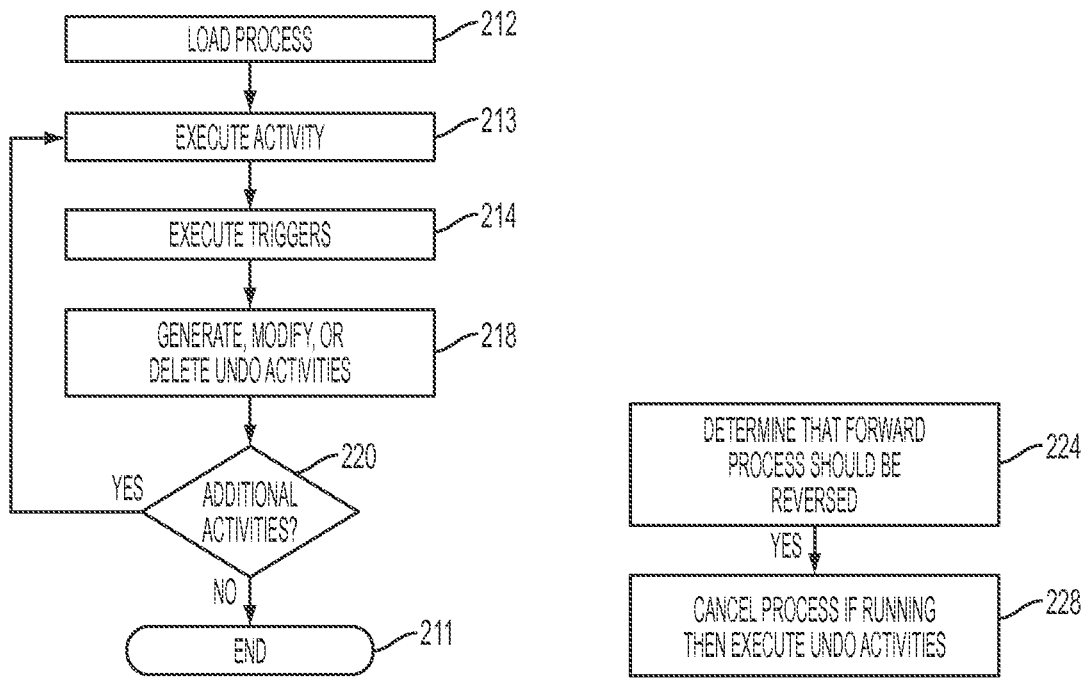
FIG. 2B
FIG. 2C

AUTOMATED PROCESS REVERSAL

FIELD

The present invention relates generally to a method for automatically reversing a process and in particular to a method and associated system for automatically generating undo activities for reversing a process.

BACKGROUND

Reversing a process using model-defined constructs, such as compensation handlers, typically includes work intensive and error prone steps with rigid results process and little flexibility. A typical reverse process that meets efficiency, adequacy, and flexibility requirements may not be associated with a backward execution of the initial process thereby creating an entirely new process. Generating custom actions for reversing process executions may be complicated, time consuming, and require a large amount of resources. Accordingly, there exists a need in the art to overcome at least some of the deficiencies and limitations described herein above.

SUMMARY

A first aspect of the invention provides an automated process reversal method comprising: defining, by a computer processor of a computing system based on user input, a forward process comprising a set of forward activities for automatically performing an automated task; defining, by the computer processor, first undo activities and associated data structures associated with undoing a first forward activity of the set of forward activities; defining, by the computer processor, first interdependencies between the first undo activities; defining, by the computer processor, first triggers comprising a first link between the first forward activity and the first undo activities; defining, by the computer processor based on the user input, second undo activities and associated data structures associated with undoing a second forward activity of the set of forward activities; defining, by the computer processor, second interdependencies between the second undo activities; and defining, by the computer processor, second triggers comprising a second link between the second forward activity and the second undo activities.

A second aspect of the invention provides a computing system comprising a computer processor coupled to a computer-readable memory unit, the memory unit comprising instructions that when executed by the computer processor implements an automated process reversal method comprising: defining, by the computer processor based on user input, a forward process comprising a set of forward activities for automatically performing an automated task; defining, by the computer processor, first undo activities and associated data structures associated with undoing a first activity of the set of forward activities; defining, by the computer processor, first interdependencies between the first undo activities; defining, by the computer processor, first triggers comprising a first link between the first forward activity and the first undo activities; defining, by the computer processor based on the user input, second undo activities and associated data structures associated with undoing a second forward activity of the set of forward activities; defining, by the computer processor, second interdependencies between the second undo activities; and defining, by the computer processor, second triggers comprising a second link between the second forward activity and the second undo activities.

A third aspect of the invention provides a computer program product, comprising a computer readable hardware storage device storing a computer readable program code, the computer readable program code comprising an algorithm that when executed by a computer processor of a computing system implements an automated process reversal method, the method comprising: defining, by the computer processor based on user input, a forward process comprising a set of forward activities for automatically performing an automated task; defining, by the computer processor, first undo activities and associated data structures associated with undoing a first forward activity of the set of forward activities; defining, by the computer processor, first interdependencies between the first undo activities; defining, by the computer processor, first triggers comprising a first link between the first forward activity and the first undo activities; defining, by the computer processor based on the user input, second undo activities and associated data structures associated with undoing a second forward activity of the set of forward activities; defining, by the computer processor, second interdependencies between the second undo activities; and defining, by the computer processor, second triggers comprising a second link between the second forward activity and the second undo activities.

The present invention advantageously provides a simple method and associated system capable of reversing activities associated with a process.

BRIEF DESCRIPTION OF THE DRAWINGS

FIG. 2, including FIGS. 2A-2C, illustrates an algorithm detailing a process flow enabled by system 100 of FIG. 1 for enabling a process for automatically generating undo activities for reversing each of its executions, in accordance with embodiments of the present invention.

FIG. 5, including

DETAILED DESCRIPTION

Figure 1:
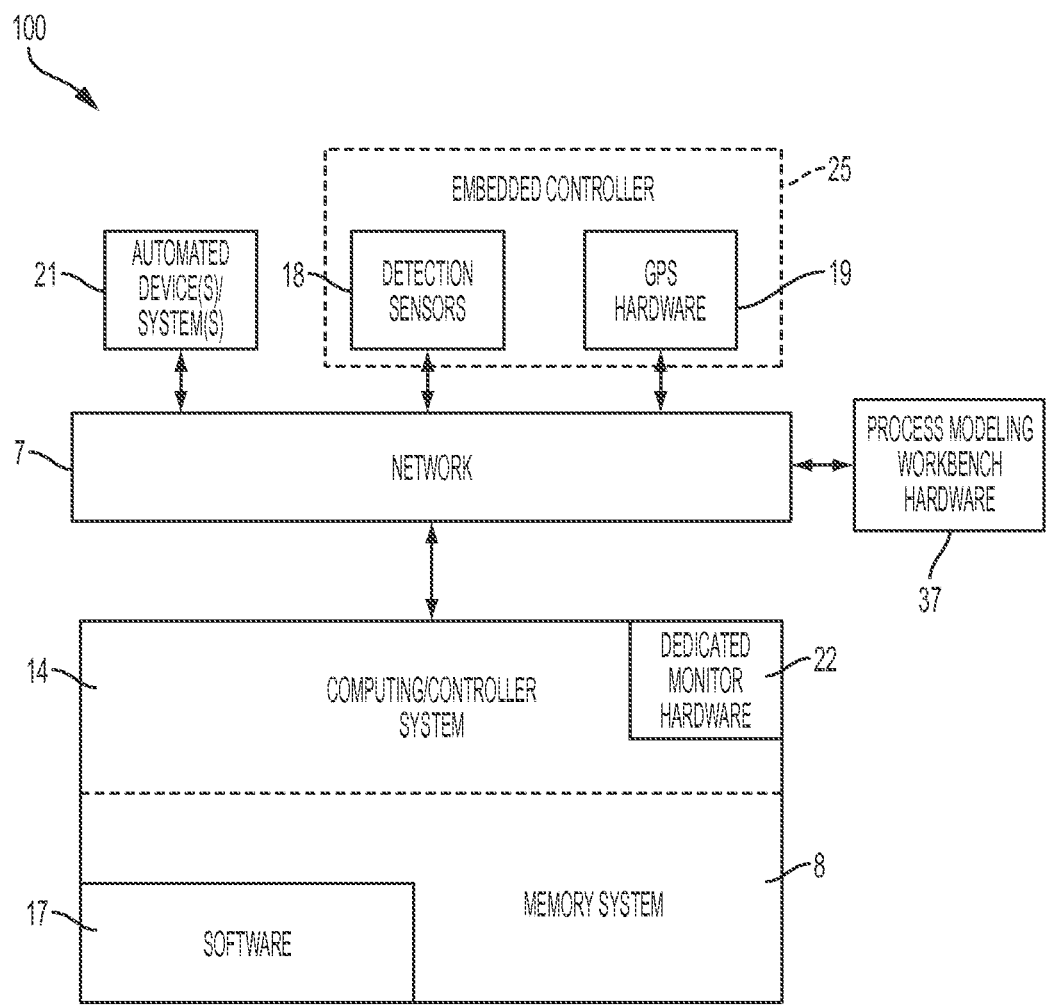
FIG. 1 illustrates a monitoring and process execution system enabling a process for automatically generating undo activities for reversing each of its executions, in accordance with embodiments of the present invention.

FIG. 1 illustrates a monitoring and process execution system 100 for enabling a process for automatically generating undo activities for reversing its executions, in accordance with embodiments of the present invention. System 100 enables automated control of activities in a forward process execution as well as generating an associated a custom undo process that is incrementally and automatically constructed during execution of each forward activity of the process. During execution of each forward activity of the process, reverse (i.e., undo) activities of a reverse process may be added, removed, or modified. Each reverse activity may comprise data values that may be updated during reverse activity addition or modification. Additionally, activities of the reverse process may comprise model-defined interdependencies that are unrelated to interdependencies of activities in the forward process. A process modeling workbench hardware 37 (of system 100) allows defining, simulating, and debugging processes that have been enabled for dynamically generating custom undo processes for their executions. Such a workbench may allow:
1. Defining activities to undo the effects of a forward process and associated data structures.
2. Defining associated interdependencies.
3. Defining triggers enabling creation/deletion/modification of undo activities during execution of the forward process. The triggers may include, inter alia, a creation trigger allowing the addition of activities to the undo process, a deletion trigger allowing removal of activities from the undo process, and a modification trigger allowing modification of the data held by activities in the undo process.

System 100 of FIG. 1 may be used for the automated execution of forward and reverse processes including the generation of custom undo processes for each forward process execution. System 100 may include an embedded controller 25, automated devices/systems 18, and process modeling workbench hardware 37 connected through a network 7 to a computing/controller system 14. Embedded controller 25 is defined herein as a computer comprising a dedicated functionality that enables various system tasks that an operating system does not handle. Embedded controller 25 may include specific internal dedicated hardware such as a micro-controller (a CPU comprising integrated memory and peripherals), sensors 18 (i.e., dedicated monitoring hardware), and GPS hardware 19. Additionally, embedded controller 25 may include its own RAM and flash ROM for its own internal software. Process modeling workbench hardware 37 may comprise a computer comprising a graphical console, a process simulator, a process debugger, a touch screen unit to simulate the firing of triggers and/or to trigger the termination and reversal of a process execution running in a graphical simulator. Sensors 18 may comprise any type of sensors including, inter alia, RFID sensors, infrared sensors, pressure sensors, temperature sensors, ultrasonic sensors, RF sensors, motion sensors, etc. Detection sensors 18 and GPS hardware 19 are used for detecting and sensing items (e.g., automated device(s)/system(s) 21) and/or users (and associated locations) associated with activities of a forward and/or reverse process. For example, an employee of a company may be issued keys, may return unnecessary keys, and may be issued an entry authorization badge during an initial forward (company hiring) process. When the employee leaves the company to pursue another job, any keys still in possession by the employee, as well as the entry authorization badge, must be returned to the company. Therefore, undo activities associated with: returning the keys and entry authorization badge are generated during execution of the forward process. Detection sensors 18 and GPS hardware 19 are enabled to automatically detect the keys and entry authorization badge (via e.g., an RFID tag, etc.) and a current location of the employee to track the keys and badges in his/her possession. Additionally (during a reverse process execution), detection sensors 18 and GPS hardware 19 may be enabled track a return process for returning the keys and entry authorization badge before the employee leaves the employment facility. Automated device(s)/system(s) 21 may comprise any type device or system associated with activities of the initial forward process and activities of the associated reverse (undo) process. For example, automated device(s)/system(s) 21 may include keys, an identification badge, an automated user authorized factory device (e.g., a conveyer belt, a computer, a PLC (programmable logic controller), a radar detector, a light barrier, RFID reader, motion sensors, etc.), etc. Computing/controller system 14 is defined herein as a computer comprising a dedicated functionality that enables various system tasks that an operating system does not handle. Computing/controller system 14 may include dedicated monitoring hardware 22 and a memory system 8. Memory system 8 may include a single memory system. Alternatively, memory system 8 may include a plurality of memory systems. Memory system 8 includes software 17. Software 17 in combination with dedicated monitoring hardware 22 enables computing/controller system 14 to monitor and automatically generate undo activities for reversing a process. Network 7 may include any type of network including, inter alia, a local area network, (LAN), a wide area network (WAN), the Internet, a wireless network, etc. Software 17 in combination with dedicated monitoring hardware 22 for automatically generating undo activities for reversing a process.

System 100 enables the implementation of a process reversal method by generating a custom undo process, which is incrementally and automatically constructed during execution of a forward process. The custom undo process is associated with the forward process execution by which it was generated and will be used to undo that execution if/when this becomes necessary. During execution of activities of a forward process, reverse activities of an associated custom undo process may be added, removed, or modified. Additionally, each reverse activity may comprise data values that may be updated during reverse activity addition or modification. Furthermore, reverse activities of the reverse process may include model-defined interdependencies that are unrelated to interdependencies between forward activities of the forward process.

FIGS. 2A, 2B, and 2C, in combination, illustrate an algorithm detailing a flow of steps enabled by system 100 of FIG. 1 for enabling a process for automatically generating undo activities for reversing its executions, in accordance with embodiments of the present invention. Each of the steps in the algorithms of FIGS. 2A, 2B, and 2C may be enabled and executed by a computer processor executing computer code. In step 200, a forward process comprising a set of forward activities for automatically performing an automated task is defined based on user input. In step 202, undo activities and associated data structures associated with undoing the effects of one or more forward activities are defined. In step 204, interdependencies between the undo activities are defined. In step 208, triggers comprising a link between the forward activity and undo activities (of step 202) are defined. In step 210, it is determined if any additional undo activities are available for definition. If in step 210, it is determined that additional undo activities are available for definition then step 202 is repeated. If in step 210, it is determined that additional activities for undoing the forward process are not available for definition then the flow is terminated in step 211 (i.e., the process definition is complete) and the process is loaded into system 100 of FIG. 1 to be executed (for each initiated process execution) in step 212 of FIG. 2B.

In step 213, an activity (of the loaded process) is executed. In step 214, associated (i.e., to the activity of step 213) triggers are executed. In step 218, one or more undo activities comprising the activities and associated data structures (of step 202) are dynamically generated, modified, or removed from the custom undo process in response to executing the triggers. In step 220, it is determined if additional activities (of the forward process) are available for execution. If in step 220, it is determined that additional activities (of the forward process) are available for execution then step 213 is repeated. If in step 220, it is determined that additional activities (of the forward process) are not available for execution then the forward process execution is terminated in step 221.

In step 224, it is determined that the forward process execution should be reversed. The determination may be executed after a forward process execution has been initiated, while it is running, or after a forward process execution has been terminated. In step 228, the forward process execution to be reversed is cancelled if it is still being executed, and all generated undo activities for that forward execution are automatically executed.

Figure 3:
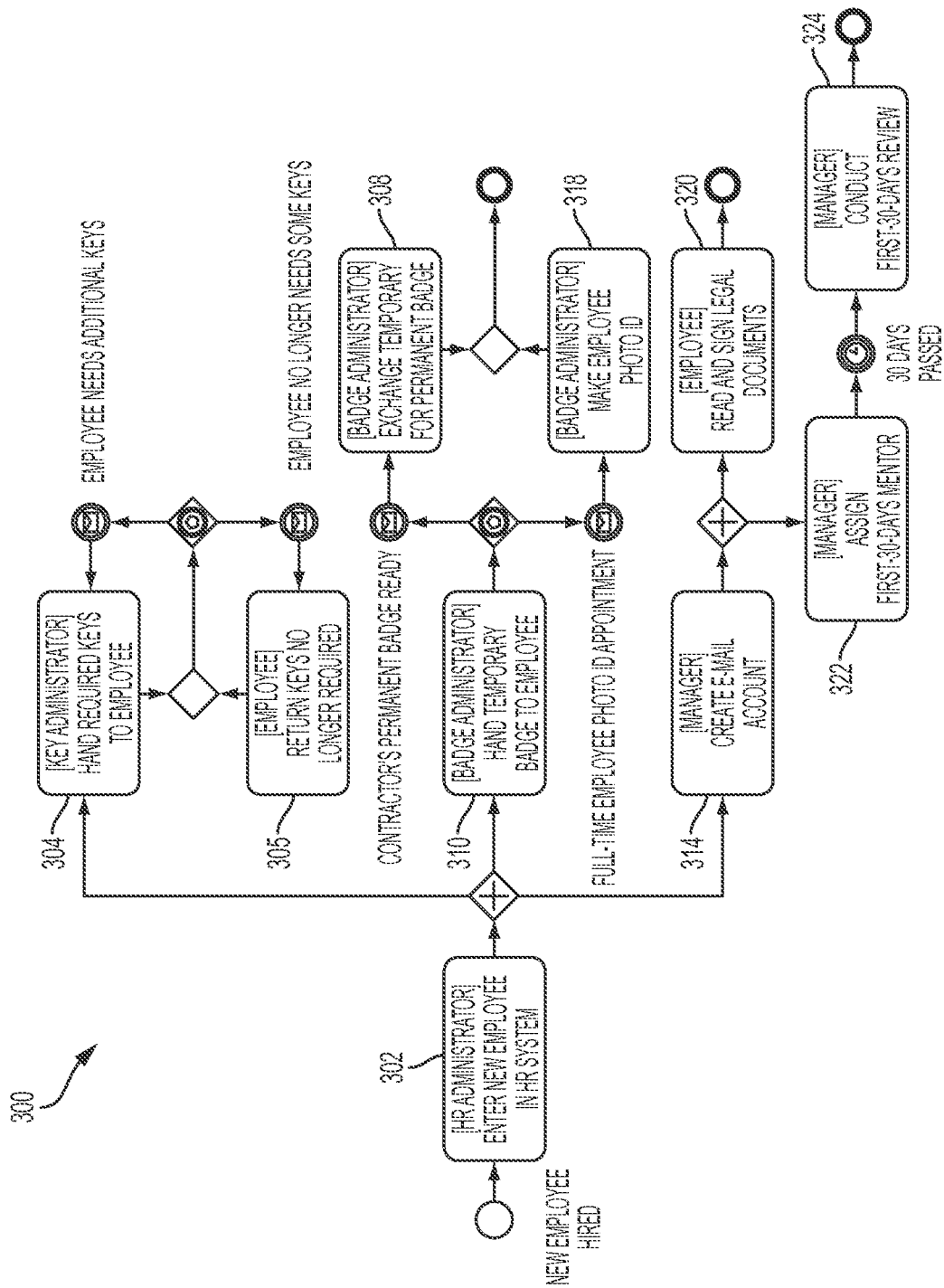
FIG. 3 illustrates an example of a forward process for initiating employment for an individual, in accordance with embodiments of the present invention.

FIG. 3 illustrates an example of a forward process 300 for initiating employment for an individual, in accordance with embodiments of the present invention. Forward process 300 describes a process for hiring a new employee. Some of its effects must be undone upon termination of the employment. For example, when the employee terminates employment, building entrance keys and identification badges must be returned, system authorizations must be revoked, exit documents must be signed, etc. A reverse process (e.g., of an employee separation) may not comprise an exact backwards execution of the forward process 300 (e.g., employee hiring). New activities (for employment separation) may be required which have no associated forward activities (for employee hiring), some of the forward activities may not require reversals, and interdependencies of reversal activities may include differing interdependencies from interdependencies of corresponding forward activities.

In step 302, a new employee is entered into the human resources (HR) system. Step 302 does not require a backwards execution upon employment termination as the HR system will mark the employee as inactive and a separation date will be added. Additional personal and/or performance related data may have to be deleted. Therefore, the undo activity for step 302 does not simply reverse the effects of its (forward) execution by removing the employee's HR record, but instead, a trigger associated with forward activity 302 generates a new set of custom activities for modification of the employee's HR record.

In step 304, a key is issued to the new employee. In step 305, a key that is no longer needed by the employee (e.g., due to changing job responsibilities) is returned to the employer. For example, when the employee resigns, all executions of forward steps 304 and 305 may be reversed by a single undo activity labelled "Return Keys", as long as the undo activity's associated data structure comprises a list of keys to be returned. Modification triggers associated with forward steps 304 and 305 may modify the undo activity's data structure by updating the list of keys currently in the employee's possession. Returning keys in a single undo activity may be more efficient than reversing each execution of forward steps 304 and 305. Steps 308, 310, and 318 comprise activities describing a means for new employees to receive their badges. For example, contractors may receive a permanent badge but not a photo ID. A reversal of steps 308, 310, and 318 includes a single activity comprising returning the badge. Step 314 comprises generating an email account for the new employee. Reversing step 314 may include revoking e-mail access and deleting or archiving email communications of the employee. While a hiring process may include no dependency between creating an e-mail account and handing out keys and badges, such dependencies may exist during a separation of employment as it may be required to maintain e-mail correspondence with the employee until additional activities of the separation process are completed.

Step 320 does not have any corresponding undo activity and step 322 may be reversed by informing the employee's mentor (of the separation) unless 30 days have passed and the mentoring relationship has ended, thereby illustrating that reversal activities may change or disappear as the forward process advances.

Forward process 300 illustrates that a custom undo (reversal) process may be incrementally and automatically generated during each execution of the forward process such that as forward activities are executed, activities in the reverse process may be added, removed, or modified. The undo activities additionally retain data values generated during activity addition or modification. Likewise, activities in the undo process may include interdependencies that are not related to interdependencies of forward activities. Additionally, forward process 300 illustrates that a custom undo process generated as described, supra, may comprise an efficient process for undoing the effects of a forward process execution with respect to an approach comprising compensating all completed forward activities in reverse execution order.

Modifying a business process for the automated construction of an associated undo process may be enabled via the following steps:
1. Defining undo activities to reverse effects of forward process 300 and associated data structures.
2. Defining interdependencies associated with the undo activities.
3. Defining triggers associated with the generation/deletion/modification of undo activities, during forward process execution. Each trigger is associated with an activity in the forward or undo process. Triggers are executed when associated activities complete execution. The triggers build or modify the undo process. Triggers enable an undo process to be generated for each forward process execution (i.e., each time a forward process is run). Therefore, the example illustrated in forward process 300 may comprise differing undo processes for each hired employee with respect to differing tasks and data, depending on the progress of the employee's hiring process, keys he/she possesses, an employment status, and a type of issued badge.

A reverse process execution may be initiated via process-internal events (e.g., encountering a severe error condition) or external events (e.g., an employee's decision to resign) that require the cancellation and reversal of a forward process execution. If the forward process execution is currently in progress when its reversal is required, all currently executing forward activities are cancelled. The reverse process is initiated by executing first undo activities that do not comprise any dependencies and second undo activities comprising satisfied execution dependencies (i.e., predecessors have completed) until all undo activities have completed execution. Reverse processes may not be reversed (i.e., undone) but may use the same techniques as the forward process to add, remove, or modify their own activities. For example, when conditions arise that require special measures or undoing activities in a reverse (i.e., undo) process, the reverse process may modify itself and add activities for those measures by using triggers, using the same mechanisms that have been used by the forward process execution to generate this reverse process.

Forward process 300 is defined such that associated executions may generate custom reverse processes by:
1. Defining undo activities and associated data structures.
2. Defining undo activity dependencies.
3. Defining creation/deletion/modification triggers.

Figure 4:
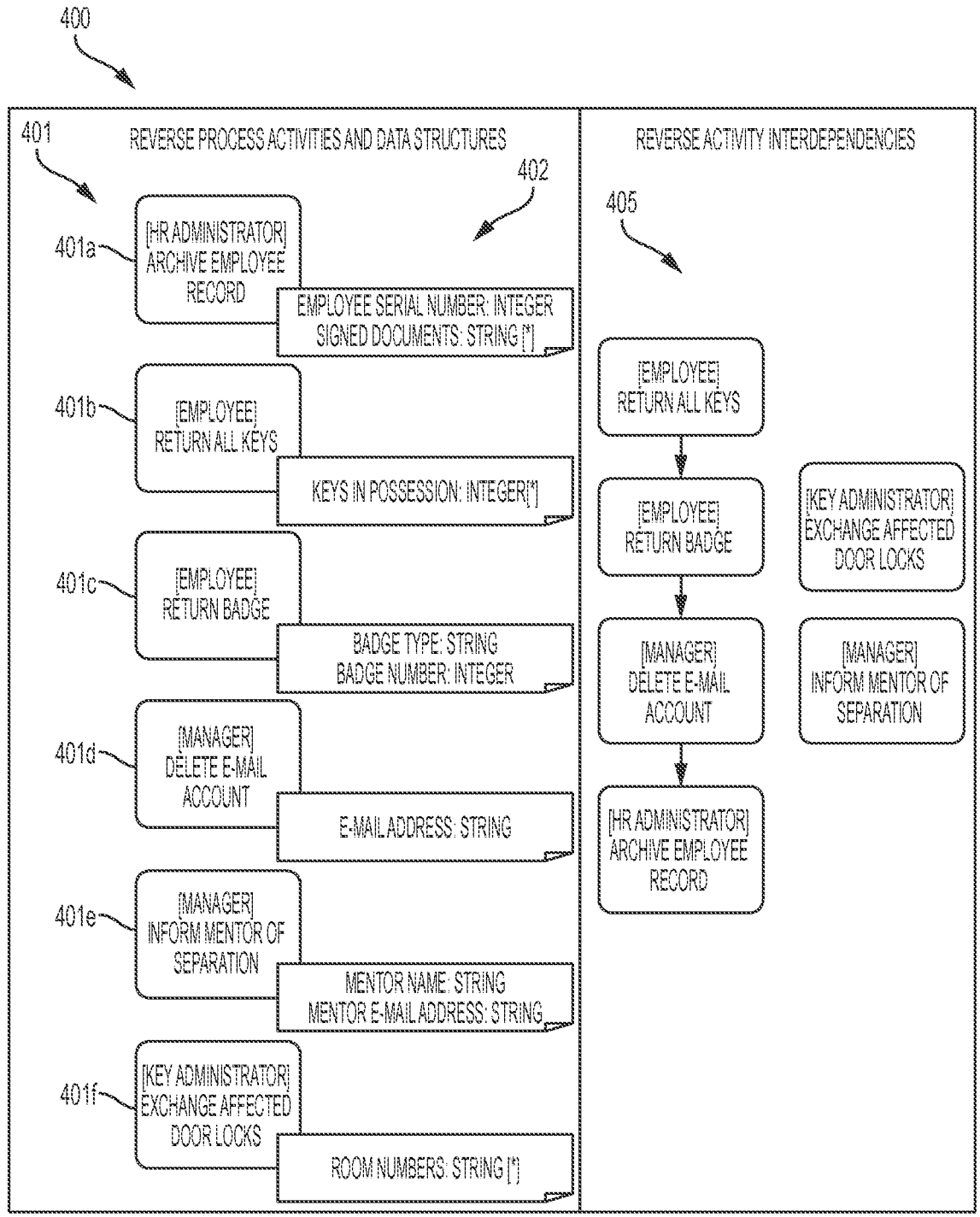
FIG. 4 illustrates an example of initiating the definition of undo activities for the forward process of FIG. 3, in accordance with embodiments of the present invention.

FIG. 4 illustrates an example of initiating a definition of undo activities with respect to forward process 300 of FIG. 3, in accordance with embodiments of the present invention. Undo activities and data structures 400 comprise undo activities 401, associated data structures 402, and dependencies 405. Undo activities 401 are not associated with respect to a 1-1 correspondence with forward activities and therefore only 6 undo activities are necessary to reverse the process 300 of FIG. 1. Activities 401a . . . 401e comprise actual reversal of forward activities of forward process 300. Activity 401f is required when a terminated employee is unable to return all of the required keys. Activity 401f comprises an example of an undo activity that does not compensate or reverse any activity in the forward process. Dependencies 405 may not be directly associated with forward activity dependencies. For example, an employee's e-mail account should not be deleted until the badge and all keys have been returned, but no corresponding dependency (between e-mail account creation, and handing out keys and badges) may exist in the forward process thereby enabling interdependencies (of the execution sequence) of the undo activities to be defined independently of the execution sequence of the forward process.

Figure 5A:
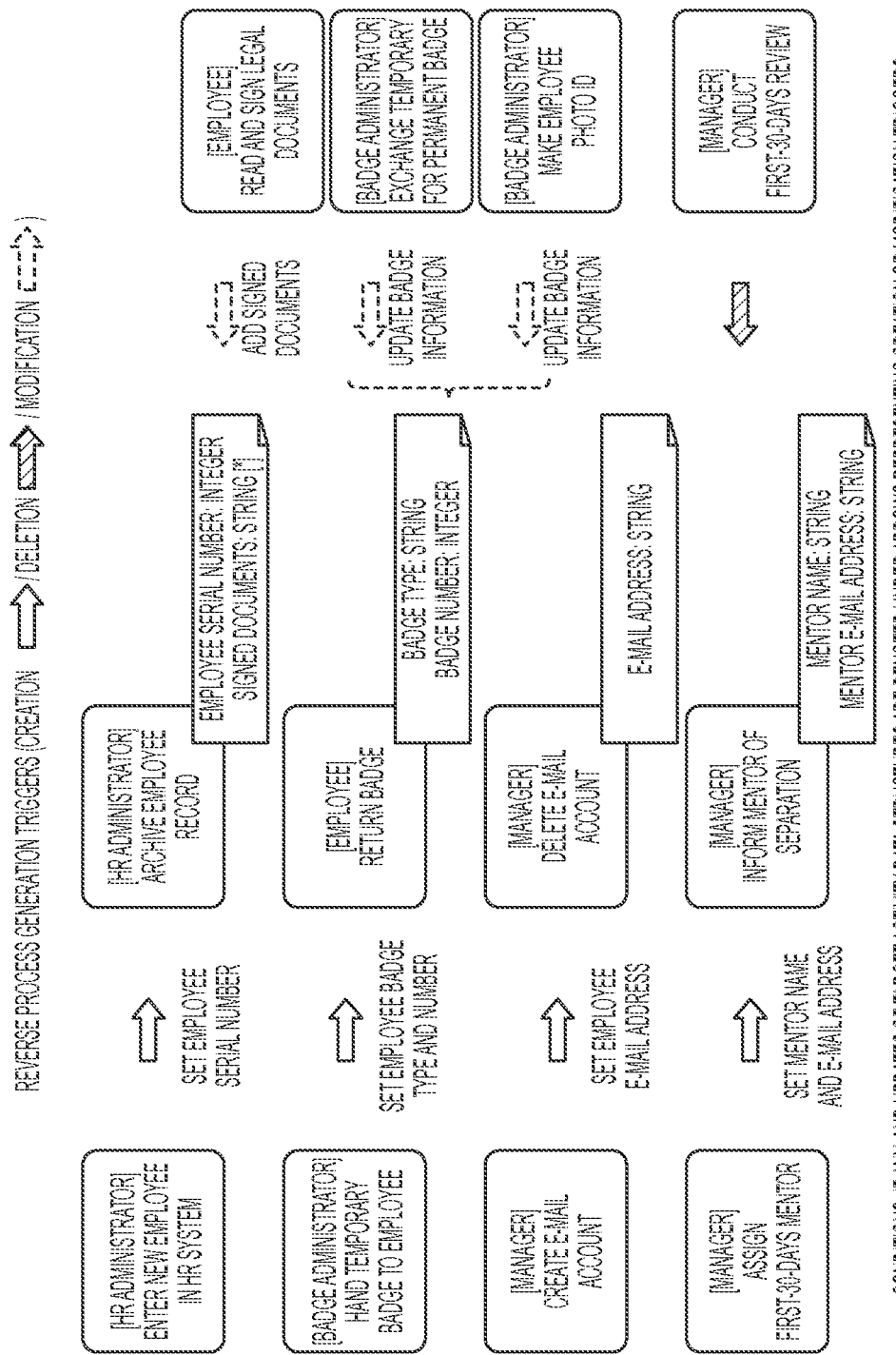
FIGS. 5A and 5B, illustrates an example of defining triggers for linking a forward process to a reverse process, in accordance with embodiments of the present invention.
Figure 5B:
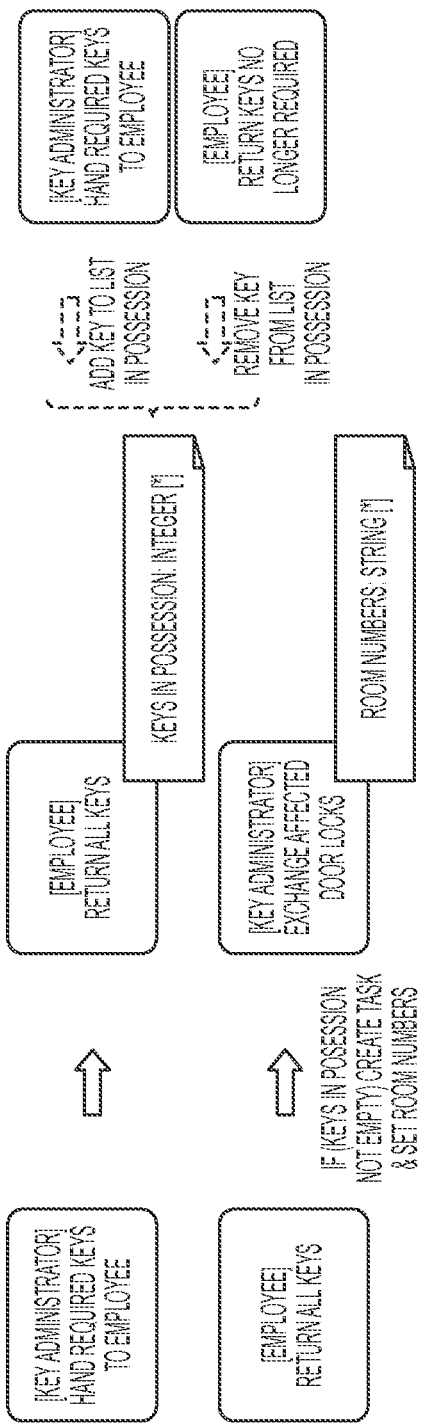

FIG. 5, including FIGS. 5A and 5B, illustrates an example of defining triggers for linking a forward process to a reverse process, in accordance with embodiments of the present invention. Each trigger is associated with a forward activity that executes the trigger upon completion. The effect of the trigger is the creation, modification, or deletion of an undo activity in the reverse process that is associated with the process execution that fired it. Creation and modification triggers may update the data of an activity created or modified. Executing a trigger may comprise conditional processing which may depend on any data available to an activity that executes the trigger. Creation triggers may be executed when an associated activity is executed first (i.e., repeated activity executions may not lead to the creation of multiple tasks in the reverse process). Likewise, deletion triggers may only execute after the first execution of the associated activity. Modification triggers may execute each time their associated activity completes unless they are blocked by a condition.

Figure 6:
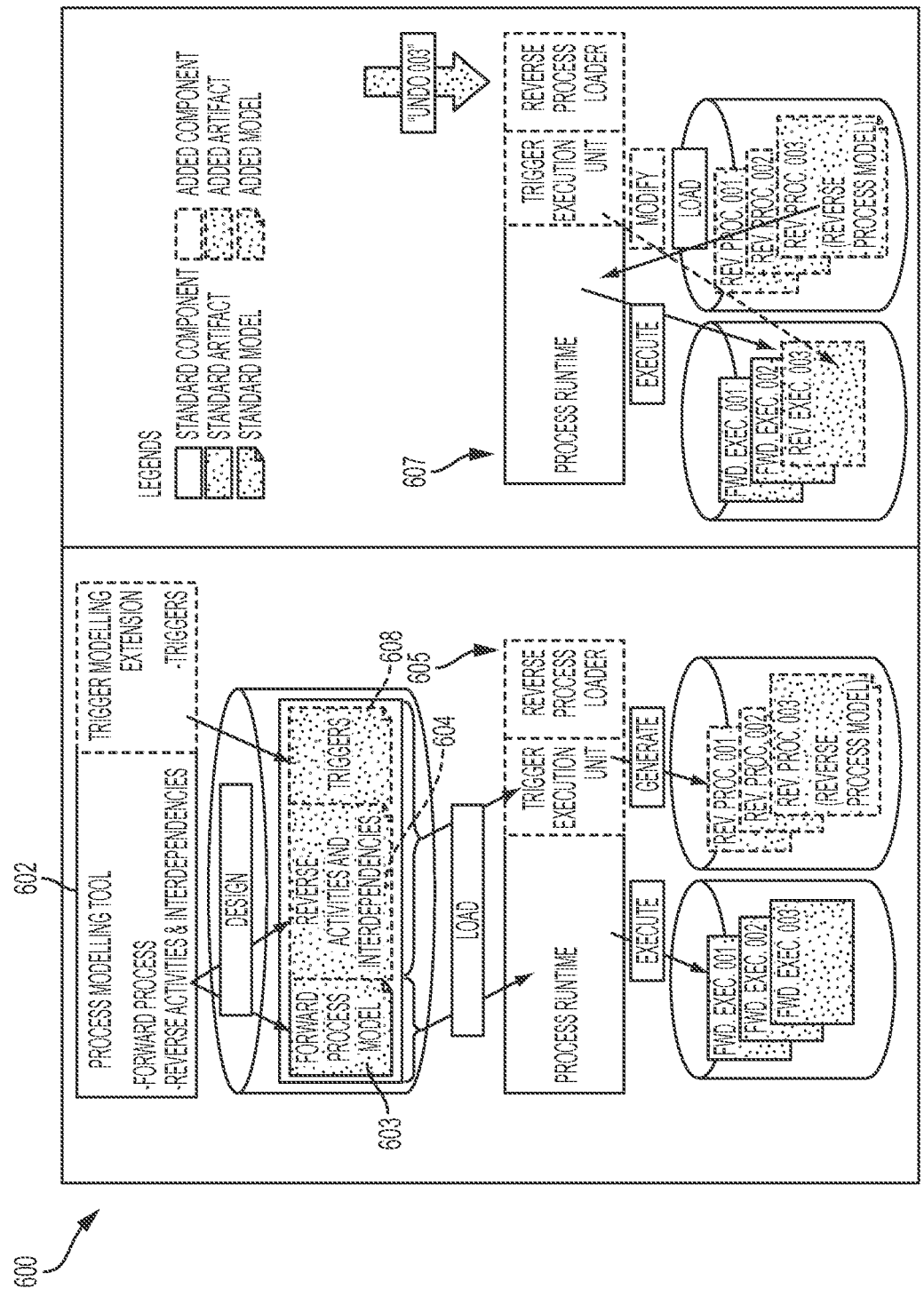
FIG. 6 illustrates a system comprising tool and runtime components to design and execute reversible processes, in accordance with embodiments of the present invention.

FIG. 6 illustrates a system 600 comprising tool and runtime components to design and execute reversible processes, in accordance with embodiments of the present invention. System 600 comprises a process modelling tool 602 for modeling a forward process 603, reverse process activities, interdependencies, and associated data structures 604. Process modelling tool 602 additionally defines triggers 608 (i.e., create/delete/modify) for connecting (forward or reverse) activities with reverse activities. Creation and modification triggers may comprise associated maps to populate data structures of the targeted reverse activity based on available data with respect to an associated activity whose completion fires the trigger. Additionally, system 600 enables forward process execution 605 and reverse process execution 607.

Figure 7:
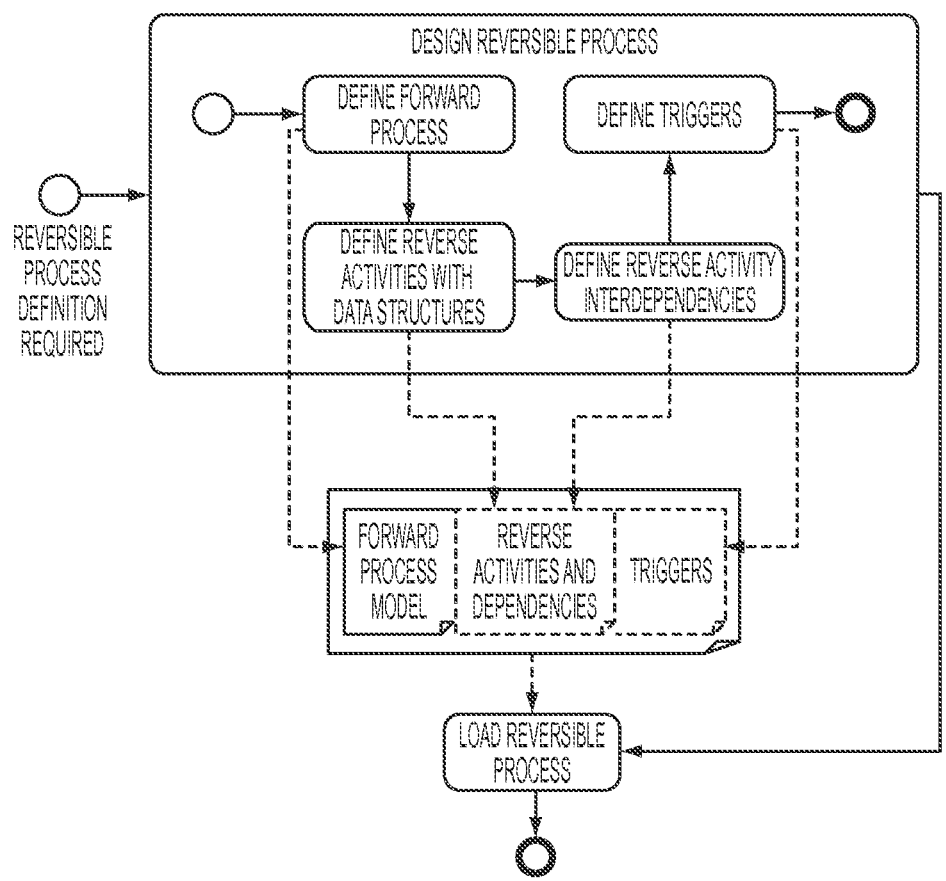
FIG. 7 illustrates steps to design a reversible process, in accordance with embodiments of the present invention.

FIG. 7 illustrates steps to design a reversible process, in accordance with embodiments of the present invention. The reversible process results in a forward process model being extended by reverse process activities (i.e., undo activities), associated interdependencies, data structures, and triggers. Undo activities and associated interdependencies comprise building blocks for a plurality of reverse processes which are dynamically generated for each forward process execution as the triggers are executed at runtime as illustrated with respect to FIG. 8, infra.

Figure 8:
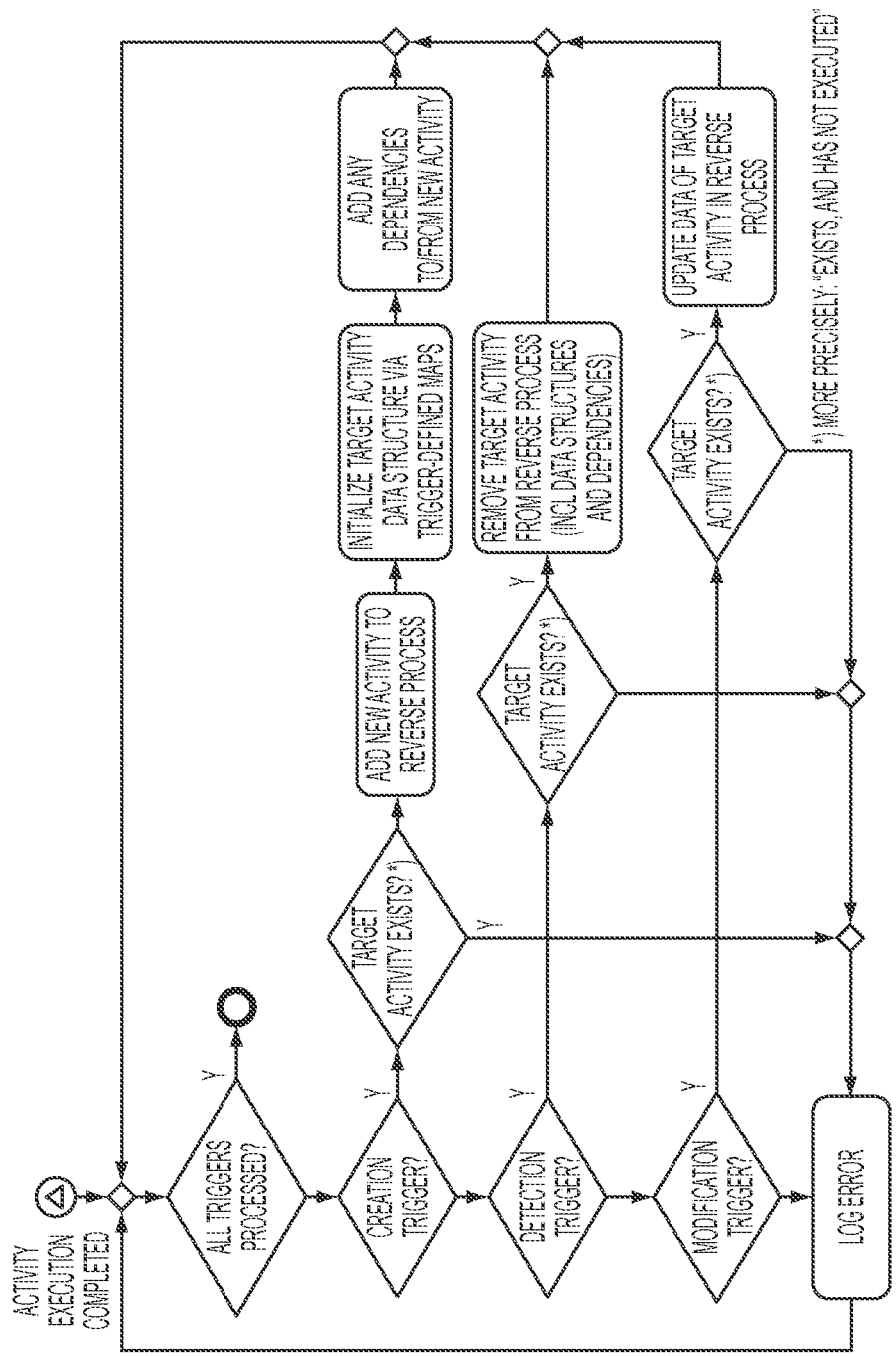
FIGS. 8 and 9 (including FIG. 9A and FIG. 9B), in combination, illustrate a detailed description of the forward process execution, the generation of custom reverse processes for each execution, and the reverse process execution of FIG. 6, in accordance with embodiments of the present invention.
Figures 9A, 9B:
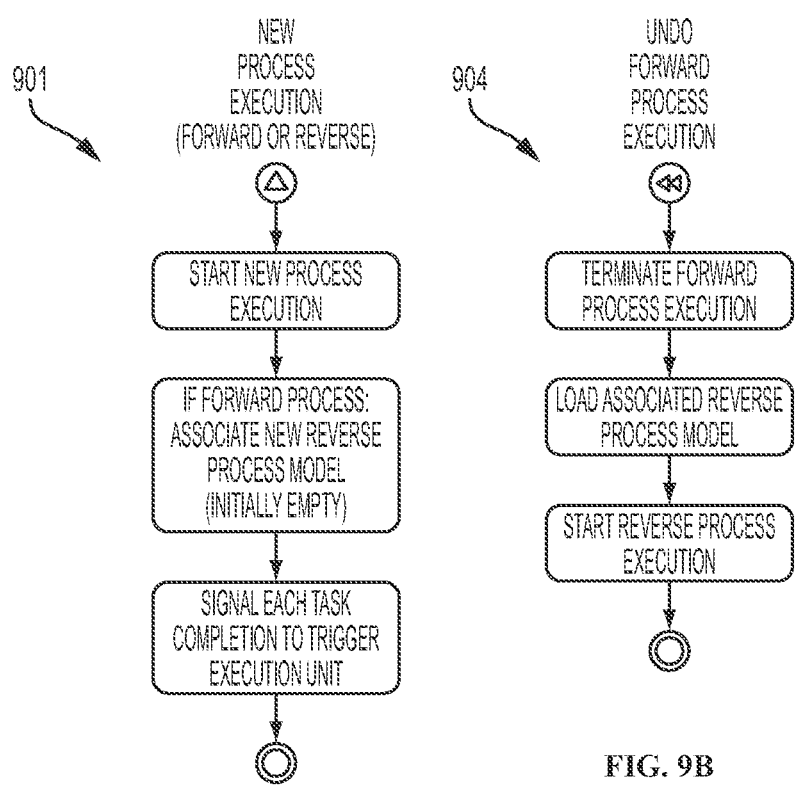

FIGS. 8 and 9 (including FIG. 9A and FIG. 9B), in combination, illustrate a detailed description for forward process execution 605 and reverse process execution 607 of FIG. 6, in accordance with embodiments of the present invention. FIGS. 8 and 9, including FIG. 9A and FIG. 9B, illustrate the operation of a process runtime that has been extended with a trigger execution unit and a reverse process loader. When a new process execution is initiated, logic with respect to the steps in 901 is executed.

Figure 10:
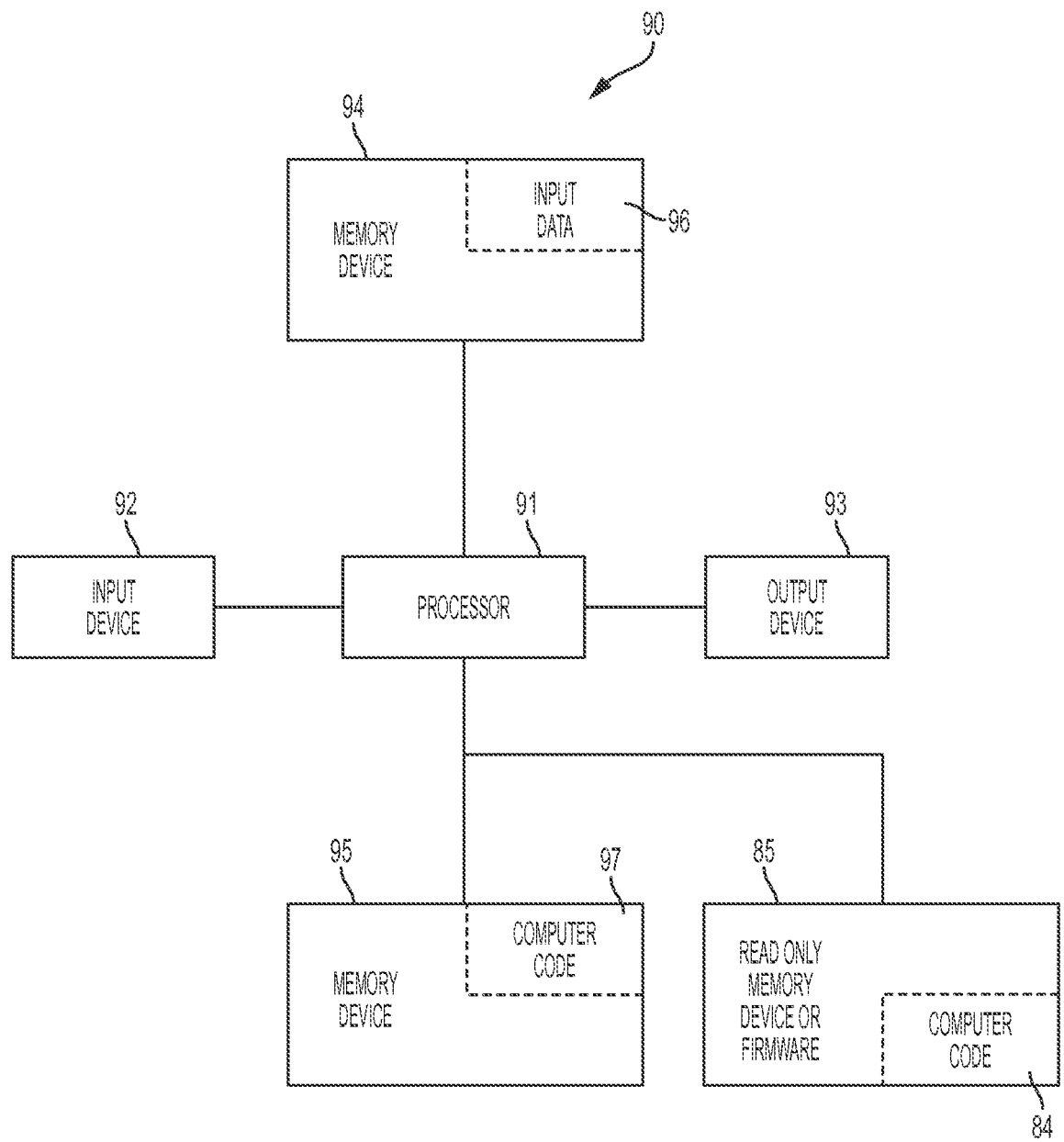
FIG. 10 illustrates a computer system 90 used by or comprised by the system of FIG. 1 for enabling a process for automatically generating undo activities for reversing each of its executions, in accordance with embodiments of the present invention.

FIG. 10 illustrates a computer system 90 (e.g., embedded controller 25, process modeling workbench hardware 37, and/or controller system 14 of FIG. 1) used by or comprised by the system of FIG. 1 for enabling a process for automatically generating undo activities for reversing its executions, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational activities to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 10 (e.g., embedded controller 25, process modeling workbench hardware 37, and/or controller system 14 of FIG. 1) includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2-5) for enabling a process for automatically generating undo activities for reversing a process. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 85) may include the algorithms of FIGS. 2-5 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture)

of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithms of FIGS. 2-5) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 84 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to automatically generate undo activities for reversing a process. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for automatically generating undo activities for reversing a process. In another embodiment, the invention provides a business method that performs the process activities of the invention on a subscription, advertising, and/or fee basis. That is, a service supplier, such as a Solution Integrator, could offer to enable a process for automatically generating undo activities for reversing a process. In this case, the service supplier can create, maintain, support, etc. a computer infrastructure that performs the process activities of the invention for one or more customers. In return, the service supplier can receive payment from the customer(s) under a subscription and/or fee agreement and/or the service supplier can receive payment from the sale of advertising content to one or more third parties.

While FIG. 10 shows the computer system 90 as a particular configuration of hardware and software, any configuration of hardware and software, as would be known to a person of ordinary skill in the art, may be utilized for the purposes stated supra in conjunction with the particular computer system 90 of FIG. 10. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An automated process reversal method comprising:
defining based on user input of a user, by a computer processor of a dedicated controller system comprising dedicated monitoring hardware, a forward process comprising a set of forward activities for automatically performing an automated task;
generating, by said computer processor based on said user input, simulation and debugging process code for dynamically generating first undo activities and associated data structures associated with undoing a first forward activity of said set of forward activities task, wherein said first forward activity comprises an activity associated with usage of an automated user identification badge and associated keys for an employment facility;
defining, by said computer processor, first interdependencies between said first undo activities;
defining, by said computer processor, first triggers comprising a first link between said first forward activity and said first undo activities;
defining, by said computer processor based on said user input, second undo activities and associated data structures associated with undoing a second forward activity of said set of forward activities, wherein said second forward activity comprises an activity associated with usage of a user authorized factory device selected from the group consisting of a conveyer belt, a PLC, a radar detector, a light barrier, an RFID reader, and motion sensors;
defining, by said computer processor, second interdependencies between said second undo activities;
defining, by said computer processor, second triggers comprising a second link between said second forward activity and said second undo activities;
executing said first forward activity;
executing in response to said executing said first forward activity, said first triggers;
detecting, by said processor via sensors of an embedded controller, automated electronic devices associated with said user and an associated current location of said user, wherein said sensors are selected from the group consisting of RFID sensors, infrared sensors, temperature sensors motion sensors, and global positioning satellite (GPS) sensors;
dynamically generating in response to said executing said first triggers and results of said detecting, a first undo task comprising said first undo activities and associated data structures associated with undoing said first forward activity;
executing said second forward activity;
executing in response to said executing said second forward activity, said second triggers;
dynamically generating in response to said executing said second triggers, a second undo task comprising said second undo activities and associated data structures associated with undoing said second forward activity;
determining that said forward process should be reversed; and
executing in response to said determining, said second undo activities thereby:
reversing said activity associated with usage of said conveyer belt, said PLC, said radar detector, said light barrier, said RFID reader, and said motion sensors;
revoking a system authorization with respect to said dedicated controller system;
directing, by said processor in response to said second undo activities and detecting said automated user identification badge and said associated keys, said user such that said user proceeds to return said automated user identification badge and said associated keys to said employment facility; and
tracking, by said processor, said return of said automated user identification badge and said associated keys to said employment facility.

2. The method of claim 1, wherein said first triggers comprise a creation trigger for said dynamically generating said first undo task comprising said first undo activities and associated data structures.

3. The method of claim 1, wherein said first triggers comprise a deletion trigger for removing a generated undo activity and data structure associated with said undoing said first forward activity.

4. The method of claim 1, wherein said first triggers comprise a modification trigger for modifying said associated data structures associated with undoing said first forward activity.

5. The method of claim 1, further comprising:
defining, by said computer processor, third interdependencies between said second undo activities and said first undo activities associated with undoing said first forward activity or said second forward activity of said set of forward activities.

6. The method of claim 1, wherein said first undo activities and associated data structures and said second undo activities and associated data structures are further associated with undoing additional forward activities of said set of forward activities.

7. The method of claim 1, further comprising:
providing at least one support service for at least one of creating, integrating, hosting, maintaining, and deploying computer-readable code in the computing system, said code being executed by the computer processor to implement: said defining said forward process, said defining said first undo activities, said defining said first interdependencies, said defining said first triggers, said defining said second undo activities, said defining said second interdependencies, and said defining said second triggers.

8. A dedicated controller system comprising dedicated monitoring hardware and a computer processor coupled to a computer-readable memory unit, said memory unit comprising instructions that when executed by the computer processor implements an automated process reversal method comprising:
defining, by said computer processor based on user input of a user, a forward process comprising a set of forward activities for automatically performing an automated task;
generating, by said computer processor based on said user input, simulation and debugging process code for dynamically generating first undo activities and associated data structures associated with undoing a first forward activity of said set of forward activities task, wherein said first forward activity comprises an activity associated with usage of an automated user identification badge and associated keys for an employment facility;
defining, by said computer processor, first interdependencies between said first undo activities;
defining, by said computer processor, first triggers comprising a first link between said first forward activity and said first undo activities;
defining, by said computer processor based on said user input, second undo activities and associated data structures associated with undoing a second forward activity of said set of forward activities, wherein said second forward activity comprises an activity associated with usage of a user authorized factory device selected from the group consisting of a conveyer belt, a PLC, a radar detector, a light barrier, an RFID reader, and motion sensors;
defining, by said computer processor, second interdependencies between said second undo activities;

defining, by said computer processor, second triggers comprising a second link between said second forward activity and said second undo activities;
executing said first forward activity;
executing in response to said executing said first forward activity, said first triggers;
detecting, by said processor via sensors of an embedded controller, automated electronic devices associated with said user and an associated current location of said user, wherein said sensors are selected from the group consisting of RFID sensors, infrared sensors, temperature sensors motion sensors, and global positioning satellite (GPS) sensors;
dynamically generating in response to said executing said first triggers and results of said detecting, a first undo task comprising said first undo activities and associated data structures associated with undoing said first forward activity;
executing said second forward activity;
executing in response to said executing said second forward activity, said second triggers;
dynamically generating in response to said executing said second triggers, a second undo task comprising said second undo activities and associated data structures associated with undoing said second forward activity;
determining that said forward process should be reversed; and
executing in response to said determining, said second undo activities thereby:
reversing said activity associated with usage of said conveyer belt, said PLC, said radar detector, said light barrier, said RFID reader, and said motion sensors;
revoking a system authorization with respect to said dedicated controller system;
directing, by said processor in response to said second undo activities and
detecting said automated user identification badge and said associated keys, said user such that said user proceeds to return said automated user identification badge and said associated keys to said employment facility; and
tracking, by said processor, said return of said automated user identification badge and said associated keys to said employment facility.

9. The computing system of claim 8, wherein said first triggers comprise a creation trigger for said dynamically generating said first undo task comprising said first undo activities and associated data structures.

10. The computing system of claim 8, wherein said first triggers comprise a deletion trigger for removing a generated undo activity and data structure associated with said undoing said first forward activity.

11. The computing system of claim 8, wherein said first triggers comprise a modification trigger for modifying said associated data structures associated with undoing said first forward activity.

12. The computing system of claim 8, wherein said method further comprises:
defining, by said computer processor, third interdependencies between said second undo activities and said first undo activities associated with undoing said first forward activity or said second forward activity of said set of activities.

13. A computer program product, comprising a computer readable hardware storage device storing a computer readable program code, said computer readable program code comprising an algorithm that when executed by a computer processor of a dedicated controller system, comprising dedicated monitoring hardware, implements an automated process reversal method, said method comprising:

defining, by said computer processor based on user input of a user, a forward process comprising a set of forward activities for automatically performing an automated task;

generating, by said computer processor based on said user input, simulation and debugging process code for dynamically generating first undo activities and associated data structures associated with undoing a first forward activity of said set of forward activities task, wherein said first forward activity comprises an activity associated with usage of an automated user identification badge and associated keys for an employment facility;

defining, by said computer processor, first interdependencies between said first undo activities;

defining, by said computer processor, first triggers comprising a first link between said first forward activity and said first undo activities;

defining, by said computer processor based on said user input, second undo activities and associated data structures associated with undoing a second forward activity of said set of forward activities, wherein said second forward activity comprises an activity associated with usage of said user authorized factory device selected from the group consisting of a conveyer belt, a PLC, a radar detector, a light barrier, an RFID reader, and motion sensors;

defining, by said computer processor, second interdependencies between said second undo activities;

defining, by said computer processor, second triggers comprising a second link between said second forward activity and said second undo activities;

executing said first forward activity;

executing in response to said executing said first forward activity, said first triggers;

detecting, by said processor via sensors of an embedded controller, automated electronic devices associated with a user and an associated current location of said user, wherein said sensors are selected from the group consisting of RFID sensors, infrared sensors, temperature sensors motion sensors, and global positioning satellite (GPS) sensors;

dynamically generating in response to said executing said first triggers and results of said detecting, a first undo task comprising said first undo activities and associated data structures associated with undoing said first forward activity;

executing said second forward activity;

executing in response to said executing said second forward activity, said second triggers;

dynamically generating in response to said executing said second triggers, a second undo task comprising said second undo activities and associated data structures associated with undoing said second forward activity;

determining that said forward process should be reversed; and executing in response to said determining, said second undo activities thereby:

reversing said activity associated with usage of said conveyer belt, said PLC, said radar detector, said light barrier, said RFID reader, and said motion sensors;

revoking a system authorization with respect to said dedicated controller system;

directing, by said processor in response to said second undo activities and detecting said automated user identification badge and said associated keys, said user such that said user proceeds to return said automated user identification badge and said associated keys to said employment facility; and tracking, by said processor, said return of said automated user identification badge and said associated keys to said employment facility.

14. The computer program product of claim 13, wherein said first triggers comprise a creation trigger for said dynamically generating said first undo task comprising said first undo activities and associated data structures.

* * * * *